US009854325B2

United States Patent
Gunther (10) Patent No.: US 9,854,325 B2
(45) Date of Patent: Dec. 26, 2017

(54) LIMP-HOME OPERATION OF AUDIO VIDEO BRIDGING NETWORKS

(71) Applicant: Harman International Industries, Inc., Stamford, CT (US)

(72) Inventor: Craig Gunther, Salt Lake City, UT (US)

(73) Assignee: HARMAN INTERNATIONAL INDUSTRIES, INC., Stamford, CT (US)

( * ) Notice: Subject to any disclaimer, the term of this patent is extended or adjusted under 35 U.S.C. 154(b) by 559 days.

(21) Appl. No.: 14/305,961

(22) Filed: Jun. 16, 2014

(65) Prior Publication Data
US 2015/0365255 A1    Dec. 17, 2015

(51) Int. Cl.
*H04N 21/647*    (2011.01)
*H04L 29/06*    (2006.01)

(52) U.S. Cl.
CPC ....... *H04N 21/647* (2013.01); *H04L 65/1069* (2013.01); *H04L 65/80* (2013.01)

(58) Field of Classification Search
None
See application file for complete search history.

(56) References Cited

U.S. PATENT DOCUMENTS

| 8,516,130 | B2 | 8/2013 | Olsen et al. |
| 2009/0160943 | A1* | 6/2009 | Badt, Jr. ................ H04L 12/24 348/180 |
| 2012/0314597 | A1 | 12/2012 | Singh et al. |
| 2013/0007288 | A1 | 1/2013 | Olsen et al. |
| 2013/0339483 | A1* | 12/2013 | Olsen .................. H04L 65/1069 709/217 |
| 2015/0131431 | A1* | 5/2015 | Gale ..................... H04L 12/437 370/225 |

OTHER PUBLICATIONS

Jorg Sommer et al. "Ethernet—A Survey on its Fields of Application", IEEE Communications Surveys and Tutorials, Institute of Electrical and Electronics Engineers, US, vol. 12, No. 2, Apr. 1, 2010, pp. 263-284.

(Continued)

*Primary Examiner* — Chirag Shah
*Assistant Examiner* — Srinivasa Reddivalam
(74) *Attorney, Agent, or Firm* — Brooks Kushman P.C.

(57) ABSTRACT

Electronic modules in a vehicle may communicate over an Audio/Video Bridging (AVB) network. The modules normally cooperate to send and receive streams of data with a specified quality of service as AVB streams. When conditions are present in which an AVB-quality stream cannot be sent over the network, the modules can communicate with certain limp-home functionality. Sending modules may send streams of data without a stream reservation as multicast messages. Receiving modules may be configured to receive the multicast messages. Network bridge modules may be configured to enable a Talker Pruning feature to facilitate handling of the multicast messages.

20 Claims, 4 Drawing Sheets

(56) References Cited

OTHER PUBLICATIONS

Christian Boiger, "Preemption and Scheduled Traffic—Impact on SRP; new-avb-boiger-preemption-scheduled-traffice-impact-on-srp", IEEE Draft; New-AVB-Boiger-Preemption-Scheduled-Traffic-Impact-On-SRP-0312, IEEE-SA, Piscataway, NJ, USA, vol. 802.1, Mar. 14, 2012, pp. 1-16.

European Patent Office, Extended European Search Report for the corresponding European Patent Application No. 15172010.9 dated Nov. 5, 2015.

IEEE Standards Association, IEEE Computer Society, IEEE Standard for Local and Metropolitan area networks—Audio Video Bridging (AVB) Systems, Sep. 30, 2011.

IEEE Standards Association, IEEE Computer Society, IEEE Standard for Local and metropolitan area networks—Media Access Control (MAC) Bridges and Virtual Bridge Local Area Networks, Aug. 31, 2011.

\* cited by examiner

LIMP-HOME OPERATION OF AUDIO VIDEO BRIDGING NETWORKS

TECHNICAL FIELD

This application generally relates to in-vehicle networking.

BACKGROUND

The increasing number of electronic modules in automotive vehicles has increased the need to effectively move data between modules. Data transmitted by one module may find uses in multiple modules. This need to move data may require vehicle and component manufacturers to adapt networks within the vehicle to support these connections. The network traffic may include audio and video data used for infotainment systems. Network traffic may also include more safety oriented audio/video data, such as communications between a back-up camera and a display. Protocols that are defined generally identify the operation of the network under normal conditions. Behavior during failure conditions may not be well specified.

As the amount of data to be communicated increases, traditional proprietary communication links may become inadequate to meet the data demands. It may be desirable to adapt existing Ethernet standards for use in vehicles. Ethernet may allow for high data transmission rates and may allow existing Ethernet hardware and software modules to be utilized. Networking standards are available from organizations such as The Institute of Electrical and Electronics Engineers (IEEE).

SUMMARY

In at least one embodiment, a module for connecting to an Audio Video Bridging (AVB) network is provided. The module includes at least one talker controller. The at least one talker controller is programmed to transmit a talker advertisement message to at least one listener controller. The talker advertisement message is indicative of an available AVB stream of data for consumption by the at least one listener controller. The at least one talker controller is further programmed to receive a failure message from one of a bridge controller and the at least one listener controller. The failure message is indicative of the at least one listener not being able to receive the available AVB stream of data from the at least one talker controller. The at least one talker controller is further programmed to, in response to receiving the failure message, transmit the available AVB stream of data as a non-AVB stream of data to the at least one listener controller. The at least one talker controller may be further programmed to withdraw the talker advertisement message from the AVB network in response to receiving the failure message. The failure message may include a first attribute indicative of the at least one listener controller not being able to receive the available AVB stream of data. The at least one listener controller may include a plurality of listener controllers and the failure message may include a first attribute indicative of at least one, but less than all, of the plurality of listener controllers being able to receive the available AVB stream of data. The at least one talker controller may be further programmed to output a diagnostic indicator to an operator in response to receiving the failure message. The diagnostic indicator may be indicative of a reduced performance mode of communication over the AVB network. The non-AVB stream of data may include a stream destination address identical to the available AVB stream of data so that the at least one listener controller receives the non-AVB stream of data without changing parameters related to the stream destination address. The non-AVB stream of data may be of a lower priority than the available AVB stream of data. The at least one talker controller may be further programmed to receive a ready message from one of the bridge controller and the at least one listener controller. The ready message may be indicative of the at least one listener controller being able to receive the available AVB stream of data from the at least one talker controller. The at least one talker controller may be programmed to, in response to receiving the ready message, transmit the available AVB stream of data as an AVB stream of data to the at least one listener controller.

In another embodiment, a module for connecting to an Audio Video Bridging (AVB) network is provided. The module includes at least one listener controller. The listener controller is programmed to transmit a request message to at least one bridge controller to receive a stream of data with a specified stream identification from a talker controller. The at least one bridge controller is configured to propagate a talker advertisement message for the stream of data with the specified stream identification to the at least one listener controller that transmits the request message. The listener controller is further programmed to receive the stream of data with the specified stream identification and determine whether the talker advertisement message has been received from the at least one bridge controller. The listener controller is further programmed to process the stream of data as an AVB stream of data in response to receiving the talker advertisement message at the at least one listener controller and process the stream of data as a non-AVB stream of data when the talker advertisement message is not received at the at least one listener controller. The at least one listener controller may be further programmed to output a diagnostic indicator to an operator in response to receiving the stream of data as the non-AVB stream of data. The at least one listener controller may be further programmed to transmit a ready message indicative of the at least one listener controller requesting to receive the stream of data as the AVB stream of data with the specified stream identification prior to receiving the talker advertisement message from the at least one bridge controller. The at least one listener controller may be further programmed to transmit a ready message indicative of the at least one listener controller requesting to receive the stream of data as the AVB stream of data with the specified stream identification in response to receiving the talker advertisement message. The specified stream identification may be a predetermined stream destination address. Processing the stream of data may include outputting video and audio data included in the stream of data to at least one of a video display and a speaker.

A computer-program product embodied in a non-transitory computer readable medium that is programmed as a listener on an Audio Video Bridging (AVB) network is provided. The computer-program product includes instructions to transmit a request message to at least one bridge controller to receive a stream of data with a specified stream identification from a talker controller. The at least one bridge controller is configured to propagate a talker advertisement message for the stream of data with the specified stream identification to the listener that transmits the request message. The computer-program product further includes instructions to receive the stream of data with the specified stream identification and determine whether the talker advertisement message has been received from the at least one bridge controller. The computer-program product further includes instructions to process the stream of data as an AVB stream of data in response to receiving the talker advertisement message and process the stream of data as a non-AVB stream of data when the talker advertisement message is not received. The computer-program product may include instructions to output a diagnostic indicator to an operator in response to receiving the stream of data as the non-AVB stream of data. The diagnostic indicator is indicative of a reduced performance mode of communication over the AVB network. The computer-program product may include instructions to transmit a ready message indicative of the listener requesting to receive the stream of data as the AVB stream of data with the specified stream identification, prior to receiving the talker advertisement message from the at least one bridge controller. The computer-program product may include instructions to transmit a ready message indicative of the at least one listener controller requesting to receive the stream of data as the AVB stream of data with the specified stream identification in response to receiving the talker advertisement message. The specified stream identification may be a predetermined stream destination address. The computer-program product may include instructions to output video and audio data included in the stream of data to at least one of a video display and a speaker.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed herein.

Figure 1:
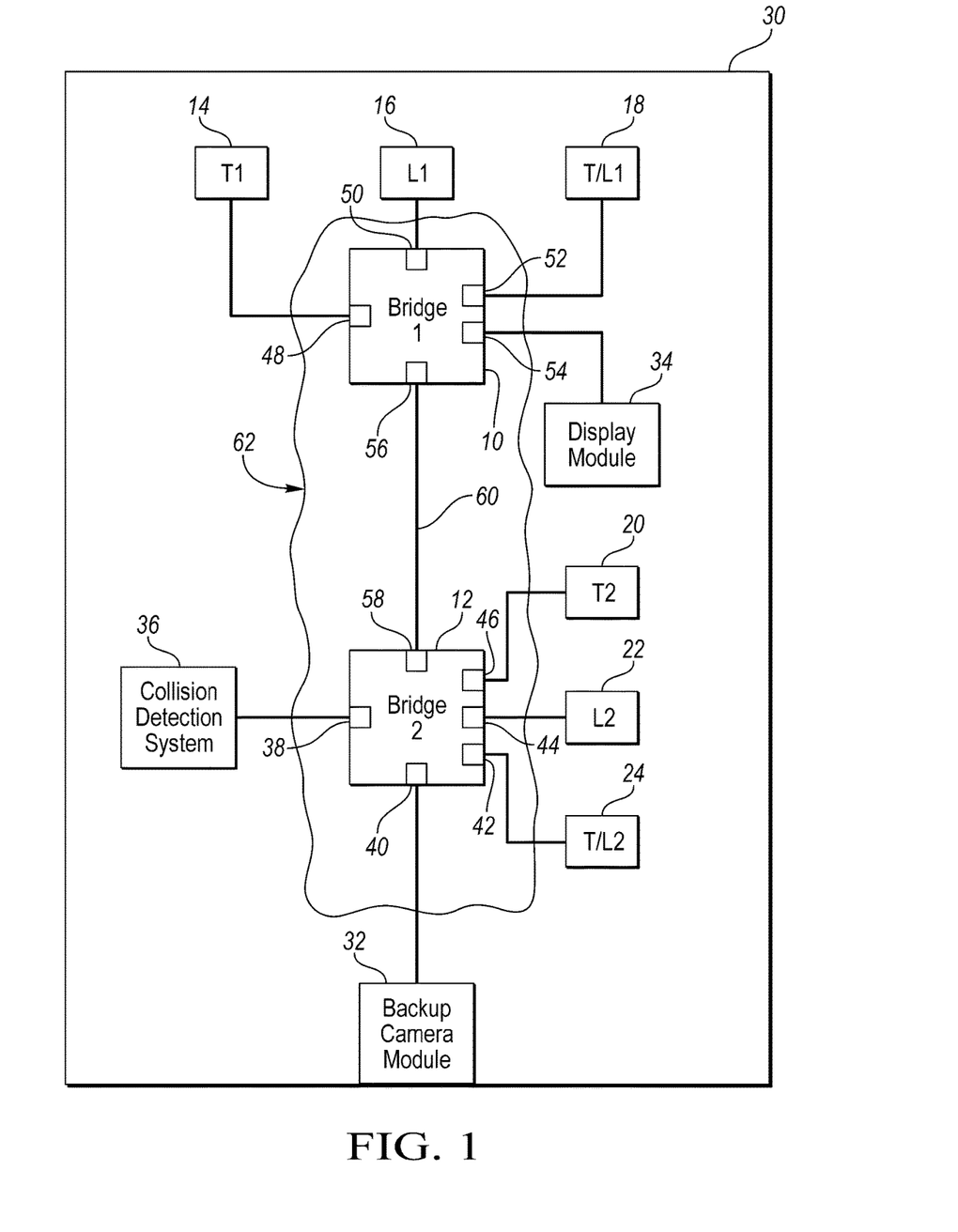
FIG. 1 depicts networked modules in a vehicle in accordance to one embodiment.

FIG. 1 depicts an interconnection of modules or devices that may be present in a vehicle 30 in accordance to one embodiment. The interconnection of modules may be referred to as a network 62. The network 62 may provide a path over which the various modules may communicate with one another. A vehicle network 62 may include one or more network bridge modules (or controllers) 10, 12. Connected to each network bridge module 10, 12 may be any number of additional modules (or controllers) (e.g., 14, 16, 18, 20, 22, 24, 32, 34, and 36). These modules (14, 16, 18, 20, 22, 24, 32, 34, and 36) may also be referred to as end stations. Each of the modules may be classified as a Talker, a Listener, or a Talker/Listener depending upon the type of network activity that the module participates in. Each end station or module may include a controller along with associated circuitry and components to physically interface with the network 62. The network 62 may include additional network bridge modules that function similar to the first 10 and second 12 bridge modules. Similarly, it is recognized that any number of modules may be connected and configured as Talkers, Listeners and/or Talker/Listeners. In some embodiments, the hardware and software features of the network bridge modules 10, 12 may be included in one or more of the end stations.

The network bridge modules 10, 12 may have one or more ports for connecting other modules to the network bridge modules 10, 12. For example, a first network bridge 10 may include a number of ports 48, 50, 52, 54, 56 that connect the modules 14, 16, 18, 34 and the second network bridge 12 to the first network bridge 10. The modules may be connected to the ports using a physical connection, such as a cable, or a wireless data connection, such as defined by IEEE 802.11. The network bridge modules 10, 12 may allow for modules to be connected to different networks. The network bridge modules 10, 12 may facilitate the communication of messages between the separate networks. Each port (e.g., 48, 50, 52, 54, 56) may connect the network bridge module (e.g., 10) to a different network bridge module (e.g., 12) or end station module (e.g., 14). The network bridges 10, 12 may relay and filter messages between ports (e.g., 14, 22). The network bridge module (e.g., 10) may route messages from one connected port (e.g., 48) to another connected port (e.g., 50) of the network bridge module (e.g., 10). The network bridge modules 10, 12 may be configured to be Audio Video (AV) bridges and satisfy requirements specified in the Institute of Electrical and Electronics Engineers (IEEE) Standard 802.1BA (Audio Video Bridging (AVB) Systems).

A Talker module (e.g., 14, 20) may provide one or more data streams on the network 62. A data stream may be comprised of one or more messages or packets that are sent over the network 62. For example, the data stream may include one or more of audio and video data. A Listener module (e.g., 16, 22) may receive one or more data streams from the network 62. A Talker/Listener module (e.g., 18, 24) may provide one or more data streams on the network 62 and may receive one or more data streams from the network 62.

Various protocols may be defined to manage the transfer of data streams between Talker modules and Listener modules.

A Talker module, T1, 14 may be connected to a port 48 of a first network bridge module 10. A Listener module, L1, 16 may be connected to a port 50 of the first network bridge module 10. A Talker/Listener module, T/L1, 18 may be connected to a port 52 of the first network bridge module 10. A second network bridge module 12 may be connected to the network 62. A Talker module, T2, 20 may be connected to a port 46 of the second network bridge module 12. A Listener module, L2, 22 may be connected to a port 44 of the second network bridge module 12. A Talker/Listener module, T/L2, 24 may be connected to a port 42 of the second network bridge module 12. The first network bridge module 10 may include a port 56 and the second network bridge 12 may include a port 58. A wired connection 60 may be positioned between the port 56 and the port 58 to enable electrical communication between the first network bridge module 10 and the second network bridge module 12.

One example of an automotive application of such a networked system may include a back-up monitoring system. The back-up monitoring system may include a backup camera 32 mounted on the back of a vehicle 30. The backup camera 32 may be configured to provide a stream of video data including video of an area behind the vehicle 30. The backup camera 32 may be a Talker module on the network 62. The backup camera 32 may be connected to a port 40 of the second network bridge module 12. The backup camera 32 may send the stream of video data to a display module 34 that may include a video display. The display module 34 may be a Listener module. The display module 34 may be mounted within a dashboard of the vehicle 30 such that the video display is visible to a driver when the vehicle 30 is operated in a reverse gear. The display module 34 may be connected to a port 54 of the first network bridge module 10. A collision detection system 36 (another Listener module) may also receive the stream of video data and may process the stream of video data to detect objects behind the vehicle 30. The collision detection system 36 may be connected to a port 38 of the second network bridge module 12. The collision detection system 36 may provide one or more of an audible and visible warning when an object is detected behind the vehicle 30.

The second network bridge module 12 may receive the stream of video data transmitted by the backup camera 32 through the associated port 40. The second network bridge 12 may determine a destination for the stream of video data. In this case, the destination may be the display module 34 which is connected to the first network bridge module 10. The second network bridge module 12 may route the steam of video data through the port 58 that is connected to the port 56 of the first network bridge module 10. The first network bridge module 10 may then route the stream of video data to the port 54 associated with the display module 34. The display module 34 may receive and process the stream of video data to display the video information. The second network bridge module 12 may also route the message from the backup camera 32 to the port 38 associated with the collision detection system 36. The collision detection system 36 may receive the stream of video data and process the stream accordingly. The collision detection system 36 may include a speaker for providing an audible warning to the driver.

Other examples are possible. For example, a Talker module (e.g., 20) may be implemented as a radio that provides audio output. A Listener module (e.g., 16) may be a front speaker module that includes one or more speakers that provide sound output near a front of the vehicle 30 based on audio data transmitted by the radio (e.g., 20). Another listener module (e.g., 22) may be implemented as a rear speaker module that includes one or more speakers that provide sound output near a rear of the vehicle 30 based on audio data transmitted by the radio (e.g., 20).

Figure 2:
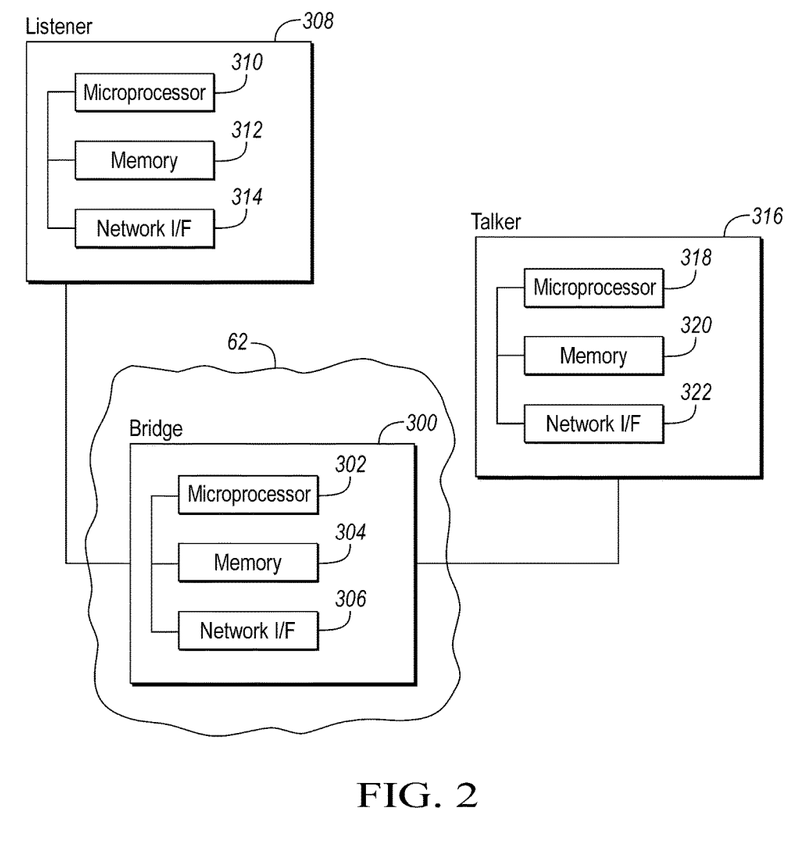
FIG. 2 depicts a high-level block diagram of various networked components connected to a network in accordance to one embodiment.

A module that is connected to the network 62 may include a controller. FIG. 2 depicts a high-level diagram of the various types of controllers that may be included in the network 62. A bridge controller 300 may include a microprocessor 302. The microprocessor 302 may interface with a memory unit 304. The memory unit 304 may store program data and instructions for the microprocessor 302 to execute. The microprocessor 302 and the memory unit 304 may interface with a network interface module 306. The network interface module 306 may include hardware components for enabling electrical communication between the bridge controller 300 and other modules (e.g., 308, 316) in the network 62. The network interface module 306 may include hardware components for enabling wireless communication between the bridge controller 300 and other modules (e.g., 308, 316). The network interface module 306 may include various registers for configuring the operation of the network interface module 306. The microprocessor 302 may implement the functions required of a network bridge module as described herein. The implementation depicted in FIG. 2 may apply to any network bridge module that is connected to the network 62.

A listener controller 308 may include a microprocessor 310. A memory unit 312 may interface with the microprocessor 310. The memory unit 312 may store program data and instructions for the microprocessor 310 to execute. A network interface module 314 may interface with the microprocessor 310 and the memory unit 312. The network interface module 314 may include hardware components for enabling electrical communication between the listener controller 308 and other devices (e.g., 300) in the network 62. The network interface module 314 may include hardware components for enabling wireless communication between the listener controller 308 and other modules (e.g., 300, 316). The network interface module 314 may include various registers for configuring operation of the network interface module 314. The microprocessor 310 may implement the functions required of a listener module as described herein. The structure as depicted in FIG. 2 may apply to any listener modules connected to the network 62.

A talker controller 316 may include a microprocessor 318. A memory unit 320 may interface with the microprocessor 318. The memory unit 320 may store program data and instructions for the microprocessor 318 to execute. A network interface module 322 may interface with the microprocessor 318 and the memory unit 320. The network interface module 322 may include hardware components for enabling electrical communication between the talker controller 316 and other devices (e.g., 300) in the network 62. The network interface module 322 may include hardware components for enabling wireless communication between the talker controller 316 and other modules (e.g., 300, 308). The network interface module 322 may include various registers for configuring operation of the network interface module 322. The microprocessor 318 may implement the functions required of a talker module as described herein. The structure as depicted in FIG. 2 may apply to any talker modules connected to the network 62.

The microprocessors (302, 310, 318) may be programmed with instructions to implement the algorithms and methods as described herein. The network 62 may be connected to additional end modules having similar configurations. Additional bridge modules may be included in the network 62 and may be configured to operate similar to the bridge module 300 depicted.

Network Operation

In the following discussion, modules may be referred to from FIG. 1 as examples. For example, when referring to a Talker module, module T1 14 may be referenced. However, any of the Talker modules (or Talker/Listener modules) shown in FIG. 1 could be referenced as well. A Talker module (e.g., 14) may transmit different types of data across the network 62. A stream of data may represent a flow of data or information between the Talker module (e.g., 14) and a Listener module (e.g., 22). The stream of data may be made up of one or more messages transmitted over the network 62. The stream of data may include command signals and data signals. The stream of data may be assigned a priority that is different from other streams. The priority of the stream of data may determine when the stream of data is transmitted in relation to other data streams. Messages associated with a stream having a higher priority may be sent before messages of streams having a lower priority. The stream of data may include audio and/or video information.

Standard networking protocols are available for communicating over the network 62. IEEE defines several standards for networking electronic devices. For example, IEEE Standard 802.1Q-2011 defines standards for Media Access Control (MAC) Bridges and Virtual Bridge Local Area Networks (LAN). The standard defines how to create a path and reserve bandwidth for streams of data to be communicated over the network 62. The 802.1Q-2011 standard describes the control packets associated with reserving network resources while other standards may define the actual format of the data streaming packets (e.g., IEEE 1722-2011 IEEE Standard for Layer 2 Transport Protocol for Time-Sensitive Applications in Bridged Local Area Networks).

A message may include of a number of components. Along with the actual data being communicated, the message may include one or more attributes to identify specific information about the message. The message may include a destination address that may be an address of a module or a group of modules. The destination address may represent the module that is to receive the message. The message may include a source address of the module that placed the message on the network 62. The source address may identify the module or end station that transmits the message. Each module connected to the network 62 may have an assigned address. The assigned address may be a MAC address that is a unique identifier assigned to each module connected to the network 62. The message may include data intended for consumption by other modules. The message may include a Priority Code Point (PCP) field that defines the relative priority of the message.

Streams or messages may be sent as several types of messages. The stream of data may be sent as a unicast message. The unicast message may be intended for a particular Listener module (e.g., 16) and may include a specified MAC address as the destination address. A Talker module (e.g., 14) may send the unicast message and the network bridge module (e.g., 10) may receive the unicast message. The network bridge module (e.g., 10) may recognize that the Listener module (e.g., 16) with the specified MAC address is connected to the port (e.g., 50) of the network bridge module (e.g., 10) and forward the unicast message to the port (e.g., 50).

The stream of data may be sent as a broadcast message. The broadcast message may be transmitted to all Listener modules (e.g., 16, 18, 22, 24) connected to the network 62. A network bridge module (e.g., 10) that receives the broadcast message may forward the message to all connected ports (e.g., 50, 52, 54, 56). In this manner, all modules or end stations may receive the broadcast message.

The stream of data may be sent as a multicast message. The multicast message may be transmitted to a group of one or more Listener modules (e.g., 16, 18). The multicast message may include a group MAC address as a destination address. The default mode of operation for the multicast message is similar to the broadcast message. The network bridge module (e.g., 10) that receives the multicast message may determine whether the port (e.g., 50, 52, 54, 56) of the network bridge module (e.g., 10) requested the multicast message. The network bridge module (e.g., 10) may determine which port or ports to transmit the stream of data based on the destination address that is included within the multicast message. If the multicast message is requested by the Listener module (e.g., 16) connected to the port (e.g., 50), the message may be forwarded on the port (e.g., 50).

To reduce network traffic and increase bandwidth, it may be desirable to configure the network 62 such that messages are only sent to modules that want to consume the messages. A particular message may be useful only by a small number of Listener modules. Sending the message over ports associated with modules that do not want to consume the message may unnecessarily increase network traffic. The IEEE standard specifies various modes of operation for network bridge modules (e.g., 10, 12) to facilitate efficient routing of the messages over the network 62.

The network 62 may define one or more Virtual Local Area Networks (VLAN). Defining the VLAN allows modules (e.g., 14, 22) connected to different network bridge modules (e.g., 10, 12) to be grouped together as if they were connected the same network bridge module (e.g., 10). A message associated with the VLAN may be sent to all of the modules that are members of the VLAN. The VLAN may be identified by a message attribute or a field within the message (e.g., VLAN Identifier (VID)). The messages associated with the VLAN may be further identified by an individual or group address.

The network bridge modules (e.g., 10, 12) may be configured to handle messages associated with VLANs. The network bridge modules (e.g., 10, 12) may classify an incoming message as belonging to a particular VLAN based on the VID. The network bridge modules (e.g., 10, 12) may associate each connected port with one or more VLAN. The network bridge modules (e.g., 10, 12) may maintain a configuration table that associates the VLAN with one or more port. The network bridge modules (e.g., 10, 12) may then forward the VLAN specific messages to the ports that are identified as being associated with the VLAN.

The Listener module (e.g., 16) attached to the port (e.g., 50) of the network bridge module (e.g., 10) may dynamically configure the port (e.g., 50) for inclusion in the VLAN by the Multiple VLAN Registration Protocol (MVRP). The MVRP allows a module (e.g., 16) to request and cancel membership in the VLAN. The module (e.g., 16) may send a MVRP membership request over the network 62 to include or exclude the module (e.g., 16) from the VLAN. The network bridge module (e.g., 10) connected to the module (e.g., 16) via the port (e.g., 50) may receive the MVRP membership request. The network bridge module (e.g., 10) may then forward all messages associated with the VLAN to the module (e.g., 16) that issued the MVRP membership request. The network bridge module (e.g., 10) may register inclusion of the modules (e.g., 16) in the requested VLAN and propagate the VLAN membership over the network 62. The network bridge module (e.g., 10) may maintain an internal table indicating the modules (e.g., 16) and the ports (e.g., 50) that are registered for each of the VLANs.

When the modules (e.g., 16, 20) have been associated with the VLAN, the Talker module (e.g., 20) may send messages associated with the VLAN and the modules (e.g., 16) that are members of the VLAN may receive the messages. The network bridges (e.g., 10, 12) may check message attributes, such as the VID, to ascertain which VLAN the message is intended for. The network bridge modules (e.g., 10, 12) may cross-reference the internal table to identify the ports (e.g., 46, 50, 56, 58) that are associated with the VLAN specified in the message. The network bridges (e.g., 10, 12) may forward the message through the ports (e.g., 46, 50, 56, 58) that are associated with the VLAN. The message may not be forwarded to ports that have not been associated with the VLAN.

In addition to VLANs, the network bridge module (e.g., 10, 12) may support various forms of message filtering. Filtering allows messages to be routed to the appropriate Listener module (e.g., 16) while eliminating unnecessary transmission to Listeners (e.g., 18) that do not desire to consume the message. The network bridge module (e.g., 10, 12) may support dynamic registration of MAC addresses to be routed to the module (e.g., 16). The module (e.g., 16) may be able to register for a specific group destination MAC address. Messages may be registered and deregistered using a Multiple MAC Registration Protocol (MMRP).

The MMRP allows the modules (e.g., 16) and the network bridges (e.g., 10, 12) to register and deregister MAC address information. The module (e.g., 16) may send a MMRP request to the network bridge module (e.g., 10) to register the destination address with the network bridge (e.g., 10). The network bridge (e.g., 10) may route the messages that arrive at the network bridge module (e.g., 10) with the destination address to the port (e.g., 50) that the module (e.g., 16) is connected to. The destination address may be group or individual MAC address. The network bridge module (e.g., 10) may process the MMRP request and propagate the MMRP request as needed to other network bridge modules (e.g., 12) between the Listener module (e.g., 16) and the Talker module (e.g., 20).

When the Listener module (e.g., 16) registers for the stream destination address using MMRP, the network bridge module (e.g., 10) will route messages with the stream destination address to the port (e.g., 50) of the registered Listener module (e.g., 16). The network bridge module (e.g., 10) will not route the message to the ports (e.g., 52) that have not registered for the stream destination address.

The network 62 may support a Stream Reservation Protocol (SRP) to create bandwidth reservations for the streams of data. The SRP may provide an ability to reserve network resources to guarantee transmission and reception of streams with the desired Quality of Service (QoS). The SRP may use the MMRP and the MVRP to establish stream reservations. The MVRP may establish membership in the VLAN where the stream of data is sourced. The MMRP may be used to control the propagation of Talker registrations through the network 62 when Talker Pruning is enabled. The SRP may also use a signaling protocol called Multiple Stream Registration Protocol (MSRP). The MSRP provides an ability to reserve network resources to guarantee a requested QoS across the network 62.

The network 62 may support a Multiple Registration Protocol (MRP). The MRP permits modules to register attributes with other modules connected to the network 62. MRP allows modules to make and withdraw attribute declarations. The attribute declarations may be propagated over the network 62. The module may make or withdraw an attribute declaration by transmitting an appropriate declaration message that identifies the attribute and the desired make or withdraw action.

The Talker module (e.g., 20) may generate a Talker declaration message. The Talker declaration message may be propagated to alert the Listener modules (e.g., 16, 18, 22, 24) that the Talker module (e.g., 20) and streams of data from the Talker module (e.g., 20) are present. The Talker declaration message may have an attribute of Talker Advertise and Talker Failed. The Talker module (e.g., 20) may transmit the Talker declaration message on the network 62 and the Listener modules (e.g., 16, 18, 22, 24) on the network 62 may receive the Talker declaration message. By default, messages with the Talker Advertise attribute are sent to every module connected to the network 62. The Talker module (e.g., 20) may also withdraw the Talker declaration, in which case, the associated attributes are removed from the network 62.

In response to receiving the Talker declaration message with the Talker Advertise attribute, the Listener module (e.g., 16) may send an MVRP request for VLAN membership for the VLAN identified in the message. The Listener module (e.g., 16) may then send a Listener declaration message with a Listener Ready attribute. Intervening network bridges (e.g., 10, 12) may change the Talker Advertise attribute to a Talker Failed attribute if the message cannot be communicated with QoS parameters specified within the message. The Listener module (e.g., 16) that receives the Talker Failed attribute may send the Listener declaration message with a Listener Asking Failed attribute.

The Listener module (e.g., 16) may generate the Listener declaration message. The network bridge module (e.g., 10) may propagate the Listener declaration message over the network 62 to indicate that the stream of data is desired by the Listener module (e.g., 16) or that the Listener module (e.g., 16) is unable to receive the stream of data. The Listener declaration message may have an attribute of one of Listener Ready, Listener Ready Failed and Listener Asking Failed. The network bridge module (e.g., 10, 12) may change the Listener declaration attribute in some situations. For example, the network bridge module (e.g., 10, 12) may change the Listener Ready attribute to the Listener Asking Failed attribute under certain conditions.

The network bridge module (e.g., 10, 12) may implement a feature called Talker Pruning. When Talker Pruning is enabled on the network bridge module (e.g., 10, 12), the Listener module (e.g., 16) may only receive the Talker declaration messages sent from the Talker module (e.g., 20) if the stream destination address is registered for the port (e.g., 50) that the Listener module (e.g., 16) is connected to. With Talker Pruning enabled, the network bridge module (e.g., 10, 12) will forward the Talker declaration message, such as the message with the Talker Advertisement attribute, to the Listener modules (e.g., 16) that have registered the stream destination address. The Talker declaration message with the Talker Advertisement attribute may be referred to as a Talker Advertisement message. When Talker Pruning is disabled, the network bridge modules (e.g., 10, 12) may forward the Talker Advertisement message to all of the ports associated with the network bridge module (e.g., 10, 12).

AVB Network Operation

A stream of data may include time-sensitive audio and video information. Streams of data including audio and video information may require synchronization of the audio and video information such that a displayed video matches an audio playback. In addition, real-time viewing may require that the streams of audio/video data have sufficient network bandwidth to allow uninterrupted playback.

Automotive manufacturers may adapt standard networking protocols, such as those defined by the IEEE. For example, IEEE Standard 802.1BA defines standards for Audio Video Bridging (AVB) systems. The AVB standard is defined to address issues such as synchronization, bandwidth and timing for data streams. Data that is sent using the AVB standard generally meets higher standards than regular network traffic. The IEEE AVB Standard defines specific network features that an AVB network may have. The AVB Standard utilizes features from IEEE Standard 802.1Q-2011 to implement a system that is useful for time-sensitive audio/visual data. The AVB standard also references IEEE 802.1AS-2011 which defines how precise timing information is synchronized throughout the AVB network. The network 62 may support AVB streams of data. The network 62 may have both AVB message traffic and non-AVB message traffic.

Modules connected to the AVB network 62 may support the earlier described VLAN functionality. Modules connected to the AVB network 62 may also support the SRP to allow the modules (e.g., 16) to establish stream reservations with particular QoS requirements. The AVB network 62 may attempt to reserve network resources to ensure that QoS requirements are met for the stream of data.

The modules (e.g., 10, 12, 16, 20) that are connected to the network 62 may cooperate to configure a network path between the modules (e.g., 16, 20). The SRP may be used to establish the network path and reserve resources for the stream of data. The network path may be required to meet certain QoS requirements, including network bandwidth and latency, before the reservation may be completed.

The Talker module (e.g., 20) may advertise an AVB stream of data on the network 62. The Talker Advertisement message may be transmitted on the network 62 by the Talker module (e.g., 20). The Talker Advertisement message may indicate that the AVB stream of data is available for consumption by the Listener modules (e.g., 16) that are connected to the network 62. The Talker Advertisement message may include various attributes regarding the AVB stream of data referenced by the Talker Advertisement message. The attributes may specify the QoS requirements for the stream including bandwidth and latency requirements. The attributes may include the stream destination address or a stream identifier. The network bridge modules (e.g., 10, 12) in the network 62 may receive the Talker Advertisement message with the associated attributes and may propagate the Talker Advertisement message to connected modules or other network bridge modules. The network bridge modules (e.g., 10, 12) may ascertain if QoS requirements for the advertised stream can be satisfied. A message that arrives at the Listener module (e.g., 16) with the Talker Advertisement attribute may indicate that there is adequate bandwidth in the network 62 between the Talker module (e.g., 20) and the Listener module (e.g., 16). The network bridge module (e.g., 10, 12) may change the Talker Advertisement attribute to the Talker Failed attribute in the event that insufficient network resources are available to handle the AVB stream of data. The message that arrives at the Listener module (e.g., 16) with the Talker Failed attribute may indicate that insufficient bandwidth is available for the AVB stream of data. The Talker Failed attribute may indicate that the AVB stream of data cannot reach the Listener module (e.g., 16) with the appropriate QoS parameters that are specified in the Talker Advertisement message.

The Listener modules (e.g., 16, 18) on the network 62 may receive the Talker Advertisement message. In response, the Listener module (e.g., 16) may register to receive the AVB stream of data. The Listener module (e.g., 16) may send an MVRP request to request membership for the VID specified in the Talker Advertisement message. The Listener module (e.g., 16) may respond by transmitting the Listener declaration message onto the network 62 that may include various listener attributes. The Listener module (e.g., 16) may send the Listener Ready attribute on the network 62 to establish the reservation to the AVB stream of data. The network bridge modules (e.g., 10, 12) in the network 62 between the Listener module (e.g., 16) and Talker module (e.g., 20) may configure the network path to reserve network resources and forward the Listener Ready message to the Talker module (e.g., 20). A reservation failed attribute may be indicative of a failure or inability to establish the reservation for the AVB stream of data, such as the Listener Asking Failed attribute and Listener Ready Failed attribute. The Listener Ready Failed attribute may indicate that one or more Listener modules (e.g., 16) are requesting the AVB stream of data but that the request has failed for some reason. The Listener Asking Failed attribute may indicate that none of the Listener modules (e.g., 16, 18, 22, 24) are able to receive the AVB stream of data. The network bridge modules (e.g., 10, 12) may change the Listener Ready attribute to one of the reservation failed attributes if there are insufficient resources to handle the stream reservation. The Listener declaration message including one of the reservation failed attributes may be comparable to a failure message indicative of the Listener module (e.g., 16) being unable to receive the AVB stream of data from the Talker module (e.g., 20).

The network bridge module (e.g., 10, 12), after receiving the Talker Advertisement message and the corresponding Listener declaration message to receive the stream, may set up resources to handle the AVB stream of data. Resources may be reserved to handle the AVB stream of data. The network bridge module (e.g., 10, 12) may configure the network path to ensure that the AVB stream of data is routed to the requesting Listener modules (e.g., 16). After receiving the Listener Ready message, the Talker module (e.g., 20) may transmit the AVB stream of data. The AVB stream of data may be propagated through the network 62 between the Talker module (e.g., 20) and the Listener module (e.g., 16). The Listener module (e.g., 16) may then receive the AVB stream of data. When the AVB reservation is completed, the AVB stream of data may meet the appropriate QoS requirements.

In the event of the Listener declaration message including the Listener Asking Failed or the Listener Ready Failed attribute (e.g., failure message), one or more Listener modules (e.g., 16) may be unable to receive the AVB stream of data. This indicates that one or more Listener modules (e.g., 16) that desire to receive the AVB stream of data are unable to receive the stream with AVB quality. The result may be that some functions may not be performed correctly or a diagnostic condition may be generated. In an automotive environment, it is desirable to provide some minimal capability in the event of such network failures. A limp-home mode of operation may provide at least a minimum amount of functionality if at all possible. An automotive network 62 should support the transmission of data under normal operating conditions as well as provide sufficient limp-home capabilities in the event of network problems.

Under certain conditions, network problems may be present that may cause the Listener module (e.g., 16) to be unable to receive the AVB stream of data. One or more modules may corrupt or alter the network 62 such that normal AVB message traffic may not be possible. For example, a Talker module (e.g., 20) may continuously transmit data streams on the network 62 and flood the network 62. Any module connected to the network 62 may develop an issue in which messages are continually sent on the network 62 reducing network capacity for other valid network traffic. Problems may arise when a wire becomes interrupted or disconnected causing a total or intermittent loss of network traffic. Instead of stopping all network traffic, it may be desirable to modify operation of the network 62 so that at least some messaging capability is retained.

For example, consider the backup camera 32 that is implemented as the Talker module and the display unit 34 that is implemented as the Listener module. The backup camera 32 may send out the Talker Advertisement message identifying the availability of an AVB stream of video data. Due to a network problem, the backup camera 32 may receive the Listener Ready Failed or the Listener Asking Failed response from the network 62. In this case, an AVB stream reservation for the AVB stream of video data may not be achieved by the display unit 34. The backup camera 32, not being able to establish the AVB stream reservation, may not send the AVB stream of video data. The display unit 34 cannot then display any video since there is no AVB stream of video data available. Current designs do not include any type of backup mode of operation. There is currently no alternate mechanism for communicating the video data from the backup camera 32 to the display unit 34.

Prior art systems may identify a failure in the AVB network 62. In the event of a network failure, prior art systems may resort to a second mode of operation. For example, an entirely different networking protocol may be implemented. A disadvantage of these schemes is that all of the modules connected to the network 62 must change protocol in the event of the network failure. This adds additional cost and complexity to all of the modules in the system as they must support the primary AVB mode of operation and a proprietary secondary mode of operation.

Limp-Home Mode for AVB Network Traffic

In the event of an AVB network failure, it may be possible to send the stream of data as a non-AVB stream of data. The quality and timing of the non-AVB stream of data may be reduced when compared to the AVB stream of data, but data may at least get through to the Listener modules (e.g., 34) that are able receive the non-AVB stream of data. Although the non-AVB stream of data may not meet the QoS defined by the AVB stream of data, the non-AVB stream of data may be good enough to allow a limp-home mode of operation. Using the backup monitoring system example, the display unit 34 may receive enough video data to display images from the backup camera 32. Although the video data may not be "high quality" with regards to timing and synchronization, the video displayed may be enough to allow a vehicle operator to identify objects that are behind the vehicle 30.

The Talker module (e.g., 32) that receives a failure message with the Listener Ready Failed attribute or the Listener Asking Failed attribute from the Listener module (e.g., 36) or the network bridge module (e.g., 10, 12) may enter into the limp-home mode of operation. Up until this time, the Talker module (e.g., 32) may have been utilizing the standard AVB protocol and sending the Talker Advertisement messages to establish stream reservations with the Listener modules (e.g., 34). Once the Talker module (e.g., 32) has ascertained that the AVB stream reservation cannot be completed with one or more of the Listener modules (e.g., 34, 36), an alternative mode of operation may be desired. Since the AVB stream reservation cannot be established, utilizing the standard AVB protocol will not ensure that the stream is sent to all of the Listener modules (e.g., 34, 36) that may desire the AVB stream of data.

In response to the above described scenario, the Talker module (e.g., 32) may withdraw the Talker Advertisement message. Withdrawing the Talker Advertisement quickly removes the Talker Advertisement from the network 62. For example, in response to a first Talker Advertisement sent over the network 62, the Talker module (e.g., 32) may receive the failure message indicating that the AVB stream reservation could not be established. The network bridge module (e.g., 10, 12) or the Listener modules (e.g., 34, 36) may send the failure message. In response to the failure message, the Talker module (e.g., 32) may inhibit sending a second subsequent Talker Advertisement messages over the network 62. The Talker module (e.g., 32) may then begin transmitting the non-AVB stream of data as a multicast message using the same stream identifier and/or stream destination address as the AVB stream of data. The Priority Code Point value provided for the non-AVB stream of data may be adjusted so that the AVB network 62 allows the non-AVB stream of data to flow without changing the stream identifier and/or the stream destination address.

Ensuring that the non-AVB stream of data is successfully transmitted to the correct Listener modules (e.g., 34, 36) requires some changes to the Listener modules (e.g., 16, 18, 22, 24, 34, 36). The Listener module (e.g., 34) may send the MMRP request for the stream destination address of the AVB stream of data from the Talker module (e.g., 32). The MMRP request may configure the network bridge modules (e.g., 10, 12) to route the AVB stream of data and the non-AVB stream of data with the stream destination address to the registered Listener modules (e.g., 34). The MMRP request may trigger appropriate processing within the network bridge modules (e.g., 10, 12) to ensure that the AVB stream of data and the non-AVB stream of data are forwarded. The network bridge modules (e.g., 10, 12) may propagate the MMRP request to any other network bridge modules (e.g., 10, 12) between the Talker module (e.g., 32) and the Listener module (e.g., 34) to ensure that the AVB stream of data and the non-AVB stream of data will be routed to the Listener module (e.g., 34).

The Listener module (e.g., 34) may continue to respond to the Talker Advertisement messages with the Listener Ready response. If the Listener module (e.g., 34) successfully establishes the AVB stream reservation via the AVB protocol, the AVB stream of data may be transmitted and received with AVB quality. If the Listener module (e.g., 34) recognizes the Talker Failed attribute or for some other reason cannot establish the AVB stream reservation, then the Listener module (e.g., 34) may receive the non-AVB stream of data due to the MMRP request. In the case of a failure to establish the AVB stream reservation, the Talker module (e.g., 32) may send the message as the non-AVB stream of data. The Listener module (e.g., 34) may receive the non-AVB stream of data and process the message accordingly.

The MMRP request registers streams as multicast data. This allows Listener modules (e.g., 34) and other end stations (e.g., 18) to indicate their presence and join a multicast group. The multicast message may be sent to one or more Listener modules (e.g., 34) that have requested the message. The default for the multicast message is to be sent to all modules. The MMRP may be used by non-AVB applications to control the flooding of multicast traffic.

The limp-home capability may utilize a network feature called Talker Pruning Normally, in the AVB network 62, the Talker Advertisement message is propagated on all of the ports (e.g., 48, 50, 52, 54, 56) of the network bridge module (e.g., 10). When Talker Pruning is enabled, the Talker Advertisement messages will only propagate on the ports (e.g., 54) that have registered the matching stream destination address. Talker Pruning uses the MMRP to pre-register for the destination Medium Access Control (MAC) address of the data streams. The Listener module (e.g., 34) may issue the MMRP request to receive the Talker Advertisement messages by registering the stream destination address. IEEE 802.1BA clause 6.7.1 indicates that Talker Pruning shall not be supported in AV bridges. The limp-home mode as described herein uses the Talker Pruning mode to achieve the desired result and this deviates from the currently defined IEEE standards for AVB networks.

The Listener module (e.g., 34) may pre-register for a desired stream of data with a specified stream destination address. With the Talker Pruning mode enabled, the Talker Advertisement messages may only be forwarded to the ports (e.g., 54) that have registered for the specified stream destination address. If the AVB reservation can be established by sending the Listener Ready in response to the Talker Advertisement message, then the network 62 may provide the desired stream of data within the QoS parameters established by AVB. If the AVB stream reservation cannot be established, the Talker module (e.g., 32) may remove the Talker Advertisement message and send the desired stream of data as the non-AVB stream of data using the specified stream destination address. The network 62 may consider this as normal multicast traffic. However, the non-AVB stream of data will not flood the network 62 because the MMRP registration has already been made for the specified stream destination address. The non-AVB stream of data may only be forwarded to the Listener module (e.g., 34) that has registered to receive the specified stream destination address. In addition, the Listener module (e.g., 34) may pre-register to join the VLAN associated with the desired stream of data using the MVRP request mechanism.

The network system as described herein provides the limp-home mode of operation for the AVB network 62. The system requires minimal changes to Talker modules (e.g., 32) and Listener modules (e.g., 34) connected to the network 62. In the case in which the AVB stream of data cannot be sent over the network 62, the system may ensure that the stream of data is sent with non-AVB quality. The streams that are sent in the limp-home mode may not have the same QoS as the AVB stream.

The above system may be implemented in the controller software of the Talker modules (e.g., 32) and Listener modules (e.g., 34). Appropriate software code may be implemented to execute the methods described herein. In addition, the network bridge controllers (e.g., 10, 12) may implement the Talker Pruning feature as described herein.

In the following discussion, reference to the Talker module may include any of the Talker modules represented in FIG. 1 and reference to the Listener module may include any of the Listener modules represented in FIG. 1. Reference to the network bridge module may include any of network bridge modules in FIG. 1. Any Talker, Listener, and network bridge module referenced may have structure as indicated by FIG. 2.

Figure 3:
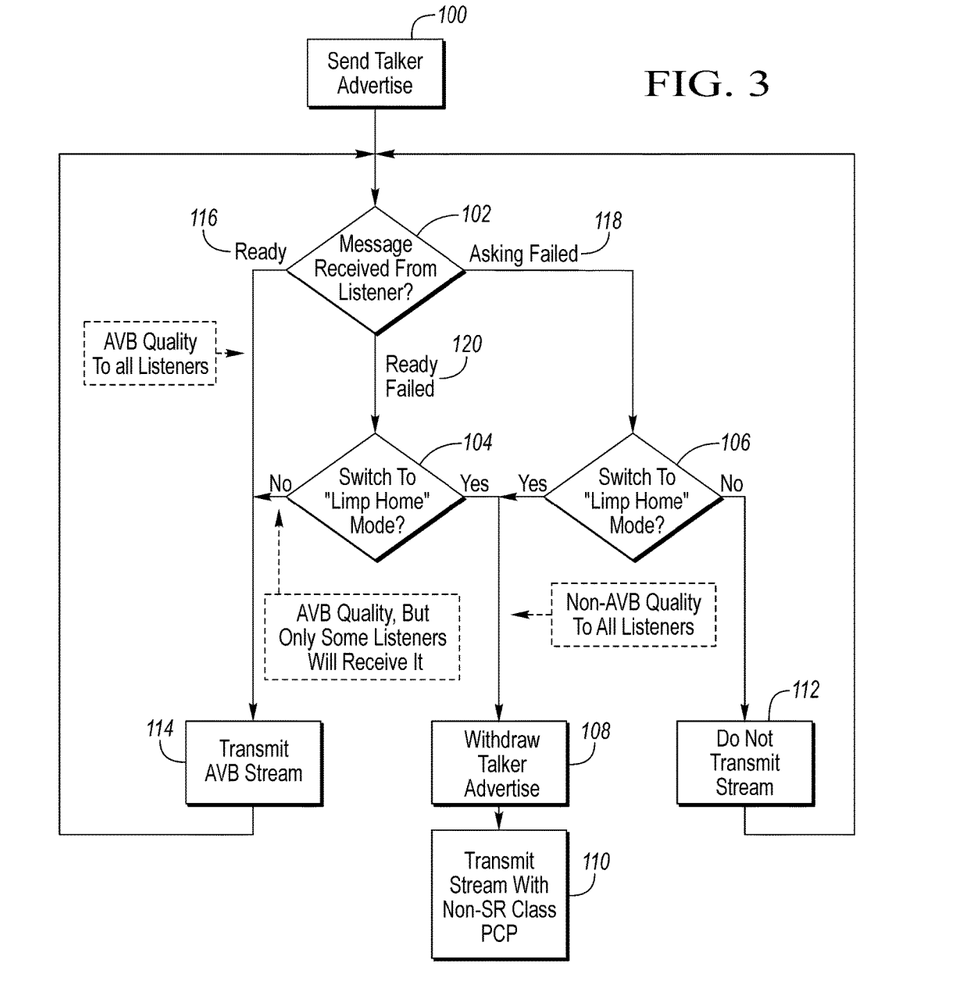
FIG. 3 is a flowchart depicting a possible sequence of operations in a Talker module in accordance to one embodiment.

FIG. 3 depicts a possible flow chart for implementing the described functionality in the Talker module. Operation 100 may be implemented to send the Talker Advertisement message over the network 62. At operation 102, the Talker module (e.g., 20) may check for messages received from the Listener modules (e.g., 16) on the network 62. The Talker module (e.g., 20) may determine the type of message received from the Listener module (e.g., 16). The messages may have the attribute of Listener Ready, Listener Asking Failed, and Listener Ready Failed. A different sequence of operations may be performed based on the type of message received from the Listener module (e.g., 16).

Path 116 may be followed if the Talker module (e.g., 20) receives the Listener Ready attribute. Operation 114 may be executed in which the Talker module (e.g., 20) may begin transmitting the AVB stream of data. In this case, the normal protocol for the AVB stream reservation is established and the AVB stream of data is sent with AVB quality to all Listener modules (e.g., 16) that desire to consume the AVB stream of data. The Talker module (e.g., 20) may continue to receive and monitor for messages from the Listener module (e.g., 16).

Path 118 may be followed if the Talker module (e.g., 20) receives the message with the Listener Asking Failed attribute. Operation 106 may be executed in which the Talker module (e.g., 20) may check to determine whether or not to enter the limp-home mode of operation. The Talker module (e.g., 20) may enter the limp-home mode by default when the Listener Asking Failed attribute is received. The Listener Asking Failed attribute indicates that no Listener module (e.g., 16) can receive the AVB stream of data. Some implementations may use other criteria for the decision to enter the limp-home mode. The decision to enter the limp-home mode may be based on the priority of the stream of data. If the priority of the stream of data is greater than a predetermined threshold, the limp-home mode may be entered to ensure that an attempt is made to transmit the stream. Alternatively, if the message is of low enough priority, the decision may be to not enter limp-home mode. If the Talker module (e.g., 20) switches to the limp-home mode of operation, operation 108 may be executed in which the Talker module (e.g., 20) may withdraw the Talker Advertisement message from the network 62. If the decision is made not to enter the limp-home mode, operation 112 may be executed in which the AVB stream of data and the non-AVB stream of data are not transmitted over the network 62. The Talker module (e.g., 20) may continue to monitor for messages received from the Listener module (e.g., 16) as a response to the Talker Advertisement message may still be received.

Path 120 may be followed if the Talker module (e.g., 20) receives the message with the Listener Ready Failed attribute. Operation 104 may be executed in which the Talker module (e.g., 20) may check to determine whether or not to enter the limp-home mode. The Listener Ready Failed attribute indicates that at least one Listener module (e.g., 18) cannot receive the AVB stream of data, but that there is at least one Listener module (e.g., 16) that can receive the AVB stream of data. The Talker module (e.g., 20) may enter the limp-home mode by default when the Listener Ready Failed attribute is received. Some implementations may use other criteria in the decision to enter the limp-home mode. If the result of the decision is not to enter the limp-home mode, then operation 114 may be executed in which the Talker module (e.g., 20) may send the AVB stream of data. The decision to enter the limp-home mode may be based on the performance impacts of the decision. The importance of some of the modules receiving the high-quality AVB stream may be weighed against all of the modules receiving a lower-quality non-AVB multicast stream.

In the case in which path 120 is followed (e.g., Listener Ready Failed attribute), some of the Listener modules are able to establish the AVB reservation to receive the AVB stream of data. A decision may be made to send the AVB stream of data to ensure that at least one Listener module (e.g., 16) receives the AVB stream of data. An alternate decision may be to enter the limp-home mode in which case all Listener modules may receive the non-AVB stream of data which may be of lower QoS. For example, the network 62 may have a Listener module (e.g., 16) associated with front speakers and a Listener module (e.g., 22) associated with rear speakers. In the event that the Talker module (e.g., 20) receives the Listener Ready Failed due to an issue with the Listener module (e.g., 20) associated with the rear speakers, it may be preferred to send the audio stream as the AVB stream of data to the Listener module (e.g., 16) associated with the front speakers. This way, a high quality stream is transmitted over the network 62 to the Listener module (e.g., 16) associated with the front speakers while the Listener module (e.g., 22) associated with the rear speakers will not receive any audio data. This may ensure that one set of speakers performs with high quality rather than having all speakers performing with lower quality.

If the Talker module (e.g., 20) switches to the limp-home mode of operation, operation 108 may be executed in which the Talker module (e.g., 20) may withdraw the Talker Advertisement message from the network 62. That is, the Talker module (e.g., 20) may withdraw the Talker Advertisement message from the network 62. Operation 110 may be executed in which the Talker module (e.g., 20) may transmit the non-AVB stream of data with a non-stream reservation class priority. In this case, the non-AVB stream of data may be sent with non-AVB quality to all Listener modules connected to the network 62 as a multicast message. The Talker module (e.g., 20) that enters the limp-home mode may set a diagnostic flag to indicate a potential issue with the AVB network 62. The Talker module (e.g., 20) may optionally attempt to re-establish AVB operation at a later time by resending the Talker Advertisement and repeating the steps of FIG. 3.

Figure 4:
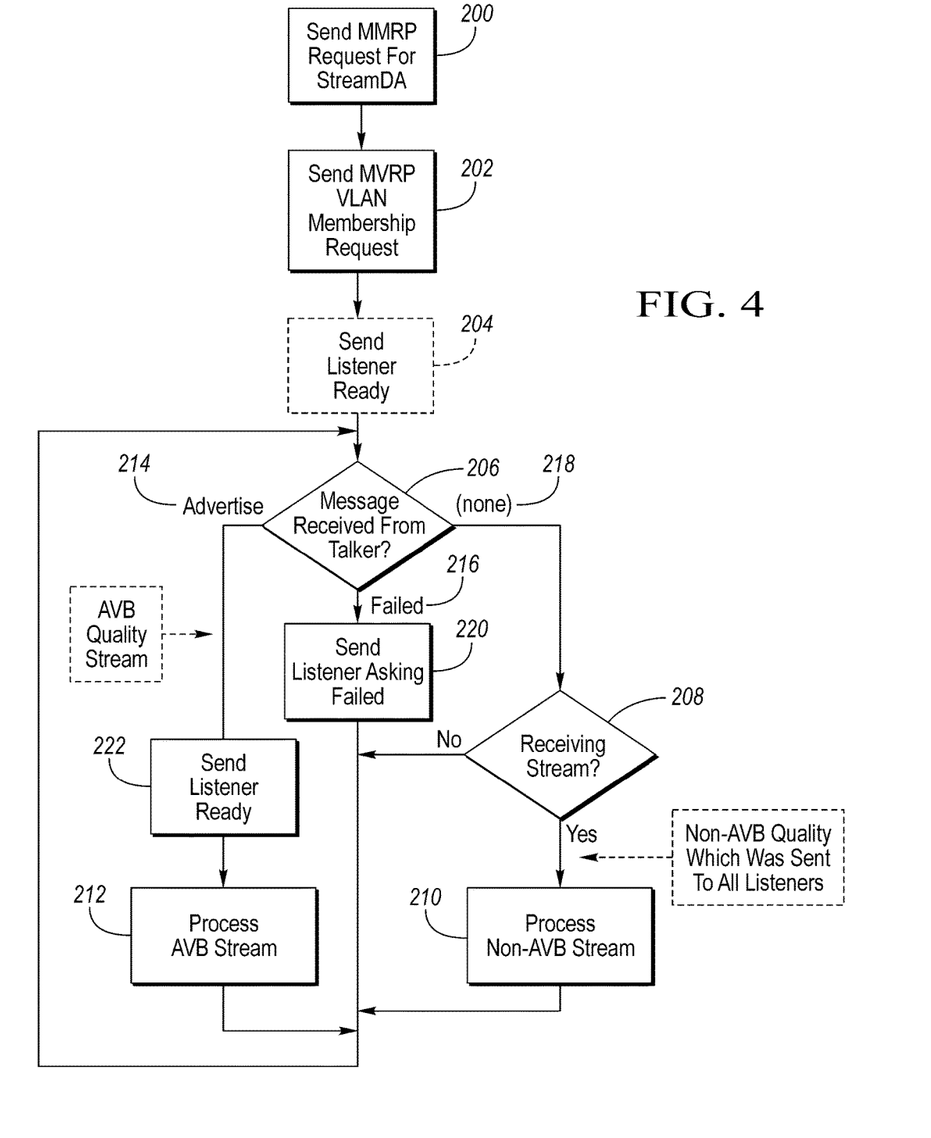
FIG. 4 is a flowchart depicting a possible sequence of operations in a Listener module in accordance to one embodiment.

FIG. 4 depicts a possible flow chart for implementing the described functionality in the Listener module (e.g., 16). Operation 200 may be implemented by the Listener module (e.g., 16) to send the MMRP request for the stream destination address. The stream destination address may correspond to the stream destination address of the desired AVB stream of data. This request may be utilized in conjunction with enabling Talker Pruning in the network bridge modules (e.g., 10, 12). This may ensure that the Talker Advertisement messages for the AVB stream of data are forwarded to the Listener module (e.g., 16).

Operation 202 may be executed by the Listener module (e.g., 16) to send the MVRP VLAN membership request. The MVRP VLAN membership request may configure the network bridge modules (e.g., 10, 12) to send the messages associated with the VLAN to the Listener module (e.g., 16). Operation 204 may be optionally implemented in which the Listener module (e.g., 16) may send the Listener declaration message with the Listener Ready attribute before a Talker Advertisement message is received by the Listener module (e.g., 16). A network bridge module (e.g., 16) may not propagate the Listener Ready attribute until the network bridge module (e.g., 10, 12) receives an associated Talker declaration with the Talker Advertise or Talker Failed attribute. The 802.1Q-2011 specification specifies that the Listener declaration message may be issued before reception of the related Talker declaration. However, in such a case, the specification indicates that the Listener module (e.g., 16) shall send the Listener declaration with the Listener Asking Failed attribute. A problem with the Listener Asking Failed attribute is that the nearest network bridge module (e.g., 10) propagates the Listener declaration towards the Talker module (e.g., 20) in response to receiving the Talker declaration message. The Talker module (e.g., 20) would receive the Listener Asking Failed attribute and possibly enter the limp-home mode prematurely. The problem may be avoided by the Listener module (e.g., 16) initially sending the Listener Ready attribute.

Operation 206 may be implemented in the Listener module (e.g., 16) in which the Listener module (e.g., 16) may check the message type that is received from the Talker module (e.g., 20). The Listener module (e.g., 16) may identify the types of messages received from the Talker module (e.g., 20) based on the attribute within the message. The message attribute may be the Talker Advertisement, the Talker Failed, or none. When the Talker module (e.g., 20) is not in the limp-home mode, the Talker module (e.g., 20) may be trying to establish the AVB reservation and may send the Talker declaration message having the Talker Advertisement attribute or the Talker Failed attribute. When the Talker module (e.g., 20) is in the limp-home mode, the Talker module (e.g., 20) may be transmitting the non-AVB stream of data with no attribute (none). Based on the type of message received, the Listener module (e.g., 16) may determine whether a received stream of data is of AVB quality or non-AVB quality.

Path 214 may be followed if the Listener module (e.g., 16) receives the Talker Advertisement message or has received the Talker Advertisement previously. When the Talker Advertisement with a desired stream destination address is received without a subsequent Talker Failed message being received, an AVB reservation may be established. Subsequent received messages with the desired stream destination address may be part of the AVB quality stream of data. Operation 222 may be implemented in which the Listener module (e.g., 16) sends the Listener declaration message with the Listener Ready attribute. Path 214 may include operations for processing the AVB quality stream of data. Operation 212 may be implemented in which the Listener module (e.g., 16) processes the subsequent received messages as the AVB quality stream of data.

Path 216 may be followed if the Listener module (e.g., 16) receives the Talker Failed message. Reception of the Talker Failed message is indicative that the stream of data will not be received with AVB quality since the reservation has not been established. The Listener module (e.g., 16) may implement operation 220 in which the Listener declaration message with the Listener Asking Failed attribute is sent. In this case, the Listener module (e.g., 16) may not receive the AVB stream of data. The Listener module (e.g., 16) may do nothing until the message with the Talker Failed attribute is withdrawn. If the Talker module (e.g., 20) has withdrawn the Talker Advertisement message, then the Listener module (e.g., 16) may not receive any Talker declaration messages from the Talker module (e.g., 20). The Listener module (e.g., 16) may set the diagnostic flag to indicate a potential issue with the AVB network 62.

Path 218 may be followed in the case that the Listener module (e.g., 16) stops receiving the Talker declaration messages. Operation 208 may be implemented in which the Listener module (e.g., 16) determines if the non-AVB stream of data with the specified stream destination address was received. If the Listener module (e.g., 16) receives the non-AVB stream of data, operation 210 may be executed by the Listener module (e.g., 16) in which the non-AVB stream of data is processed. The Listener module (e.g., 16) may set the diagnostic flag to indicate the potential issue with the AVB network 62. Whether the received message is processed as an AVB stream or a non-AVB stream, the Listener module (e.g., 16) may continue to receive messages from the Talker module (e.g., 20) and may continue to monitor the messages to determine the type of message received.

The limp-home mode of operation described herein results in a minimum of changes to the network modules. Software modifications to Talker and Listener modules may be minimized as the messages may have the same addresses. The Listener module (e.g., 16) may receive the message whether it is an AVB message or a non-AVB multicast message. The processing of the message may be the same in each case. In some cases, when the message is received as the non-AVB multicast message, the Listener module (e.g., 16) may set the diagnostic flag to indicate that the quality of the message may be degraded. A warning lamp or a dashboard warning message may indicate the diagnostic flag to the vehicle operator.

To illustrate the limp-home mode of operation, the example of the back-up monitoring system may again be used referring back to FIG. 1. The backup camera 32 may be configured to send the stream of video data over the network 62 with a predetermined stream destination address. The stream of video data may also be configured to be part of a VLAN having a predetermined VID. The network bridge modules 10, 12 may be configured to enable the Talker Pruning feature. The display module 34 may be configured to send the MMRP request for the predetermined stream destination address of the stream of video data. The first network bridge module 10 may receive the MMRP request and configure itself to route any messages having the predetermined stream destination address to the port 54 that the display module 34 is connected to. The first network bridge module 10 may propagate the MMRP request to the second bridge module 12. The second bridge module 12 may receive the propagated request and configure itself to forward all messages with the predetermine stream destination address to the port 58 that the first network bridge 10 is connected to.

The display module 34 may send the MVRP request to join the VLAN with the predetermined VID for the stream of video data. The first network bridge module 10 may receive the MVRP request and configure itself to forward any message related to the VLAN with the predetermined VID to the port 54 that the display module 34 is connected to. The first network bridge module 10 may propagate the MVRP request to the second bridge module 12. The second bridge module 12 may receive the propagated MVRP request and configure itself to forward any message related to the VLAN with the predetermined VID to the port 58 that the first network bridge 10 is connected to. The display module 34 may also send the Listener declaration message with the Listener Ready attribute.

The backup camera 32 may transmit the Talker declaration message with the Talker Advertisement attribute (e.g., Talker Advertisement message) onto the network 62. The Talker declaration message may have the predetermined stream destination address and specify particular QoS parameters that are to be met. The second bridge module 12 may receive the Talker Advertisement message. Upon receiving the Talker declaration message, the second bridge module 12 may check the stream destination address and determine whether or not to forward the message to other ports. The second bridge module 12 may also check to determine if the QoS parameters may be met. If the QoS parameters cannot be met, the second bridge module 12 may change the Talker Advertisement attribute to the Talker Failed attribute. The Talker declaration message (Talker Advertisement or Talker Failed) may be forwarded to the first network bridge module 10.

The first network bridge module 10 may receive the Talker declaration message and check the stream destination address and the QoS parameters. As the display module 34 may have sent the Listener Ready message previously, the first network bridge module 10 may send the Listener Ready over the network 62 towards the back-up camera module 32 if the stream reservation can be completed. The first network bridge module 10 may change the Talker Advertisement attribute to a Talker Failed attribute if the QoS parameters cannot be met. If the first network bridge 10 receives the Talker Failed attribute from the second network bridge 12, the Talker Failed attribute may remain unchanged. The message may then be forwarded to the display module 34.

If the Talker declaration message received by the display module 34 has the Talker Advertisement attribute, the display module 34 may transmit the Listener declaration message with the Listener Ready attribute. The first network bridge module 10 may receive the Listener declaration message and forward the Listener declaration message to the second network bridge module 12. The second network bridge module 12 may forward the Listener declaration message on to the backup camera 32. In addition, the display module 34 may prepare to begin receiving AVB messages. After receiving the Listener Ready response, the backup camera 32 may now determine that the stream of data may be sent with AVB quality and commence transmitting the AVB stream of data.

If the Talker declaration message received by the display module 34 has the Talker Failed attribute, the display module 34 may transmit the Listener declaration message with the Listener Asking Failed attribute. The Listener declaration message may propagate to the backup camera 32 through the network bridge controllers 10, 12. Upon receiving the failed message, the backup camera 32 may withdraw the Talker Advertisement messages. The backup camera 32 may start sending the non-AVB stream of data with the predetermined stream destination address. The priority of the stream of data may be changed to a non-Stream Reservation (SR) class priority. Since the MMRP request was sent earlier, the second network bridge 12 may receive the non-AVB stream of data and forward the non-AVB stream of data to the first network bridge 10. The first network bridge 10 may then forward the non-AVB stream of data on to the display module 34. The display module 34 may receive the non-AVB stream of data and may process accordingly.

In the above example, the collision detection system 36 may operate similarly to the display module 34. The above is one example of how the limp-home mode of operation may be utilized in the vehicle 30. Many other examples are possible. Each Talker and Listener module on the network 62 in the vehicle 30 may be configured with the functionality described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for being connected to an Audio Video Bridging (AVB) network, the apparatus comprising:
   at least one talker controller, including a processor, memory, and a network interface, connected within the AVB network and programmed to:
      transmit a talker advertisement message to at least one listener controller that is connected within the AVB network programmed to request and receive AVB data streams, the talker advertisement message being indicative of an available AVB stream of data for consumption by the at least one listener controller;
      receive a failure message from one of a bridge controller and the at least one listener controller, the failure message being indicative of the at least one listener not being able to receive the available AVB stream of data from the at least one talker controller over the AVB network due to a reduced performance mode of communication within the AVB network; and
   in response to receiving the failure message, transmit the available AVB stream of data within the AVB network as a non-AVB stream of data to the at least one listener controller that is connected within the AVB network and further programmed to receive the non-AVB stream, wherein the non-AVB stream is transmitted as a multicast message using a same stream identifier as the AVB stream of data and having a Priority Code Point value that allows the AVB network to pass the non-AVB stream of data without changing the stream identifier.

2. The apparatus of claim 1 wherein the at least one talker controller is further programmed to withdraw the talker advertisement message from the AVB network in response to receiving the failure message.

3. The apparatus of claim 1 wherein the failure message includes a first attribute indicative of the at least one listener controller not being able to receive the available AVB stream of data.

4. The apparatus of claim 1 wherein the at least one listener controller includes a plurality of listener controllers and wherein the failure message includes a first attribute indicative of at least one, but less than all, of the plurality of listener controllers being able to receive the available AVB stream of data.

5. The apparatus of claim 1 wherein the at least one talker controller is further programmed to output a diagnostic indicator to an operator in response to receiving the failure message, the diagnostic indicator being indicative of the reduced performance mode of communication over the AVB network.

6. The apparatus of claim 1 wherein the non-AVB stream of data includes a stream destination address identical to the available AVB stream of data so that the at least one listener controller receives the non-AVB stream of data without changing parameters related to the stream destination address.

7. The apparatus of claim 1 wherein the non-AVB stream of data is of a lower priority than the available AVB stream of data.

8. The apparatus of claim 1 wherein the at least one talker controller is further programmed to receive a ready message from one of the bridge controller and the at least one listener controller, the ready message being indicative of the at least one listener controller being able to receive the available AVB stream of data from the at least one talker controller, and, in response to receiving the ready message, transmit the available AVB stream of data as an AVB stream of data to the at least one listener controller.

9. An apparatus for being connected to an Audio Video Bridging (AVB) network, the apparatus comprising:
   at least one listener controller, including a processor, memory, and a network interface, connected within the AVB network and programmed to:
      transmit a request message to at least one bridge controller to receive a stream of data with a specified stream identification from a talker controller that is connected within the AVB network, wherein the at least one bridge controller is configured to propagate a talker declaration message for the stream of data with the specified stream identification to the at least one listener controller that transmits the request message;
   receive the stream of data with the specified stream identification;
   determine whether the talker declaration message has been received from the at least one bridge controller and whether the talker declaration message has been withdrawn from the AVB network;
   process the stream of data as an AVB stream of data in response to receiving the talker declaration message with a talker advertisement attribute at the at least one listener controller; and
   process the stream of data as a non-AVB stream of data in response to the talker declaration message being withdrawn from the AVB network after having been received without the talker advertisement attribute by the at least one listener controller due to a reduced performance mode of communication within the AVB network, wherein the non-AVB stream is received as a multicast message having a same stream identifier as the AVB stream and having a Priority Code Point value that allows the AVB network to pass the multicast message with the same stream identifier as the AVB stream.

10. The apparatus of claim 9 wherein the at least one listener controller is further programmed to output a diagnostic indicator to an operator in response to receiving the stream of data as the non-AVB stream of data, the diagnostic indicator being indicative of a reduced performance mode of communication over the AVB network.

11. The apparatus of claim 9 wherein the at least one listener controller is further programmed to transmit a ready message indicative of the at least one listener controller requesting to receive the stream of data as the AVB stream of data with the specified stream identification prior to receiving the talker declaration message from the at least one bridge controller.

12. The apparatus of claim 9 wherein the at least one listener controller is further programmed to transmit a ready message indicative of the at least one listener controller requesting to receive the stream of data as the AVB stream of data with the specified stream identification in response to receiving the talker declaration message.

13. The apparatus of claim 9 wherein the specified stream identification is a predetermined stream destination address.

14. The apparatus of claim 9 wherein processing the stream of data includes outputting video and audio data included in the stream of data to at least one of a video display and a speaker.

15. A computer-program product embodied in a non-transitory computer readable medium that is programmed as a listener on an Audio Video Bridging (AVB) network, the computer-program product comprising instructions to:
   transmit a request message to at least one bridge controller to receive a stream of data with a specified stream identification from a talker controller that is connected within the AVB network, wherein the at least one bridge controller is configured to propagate a talker declaration message for the stream of data with the specified stream identification to the listener that transmits the request message;
   receive the stream of data with the specified stream identification;
   determine whether the talker declaration message has been received from the at least one bridge controller and whether the talker declaration message has been withdrawn from the AVB network;
   process the stream of data as an AVB stream of data in response to receiving the talker declaration message with a talker advertisement attribute; and
   process the stream of data as a non-AVB stream of data in response to the talker declaration message being withdrawn from the AVB network after a having been received without the talker advertisement attribute due to a reduced performance mode of communication within the AVB network, wherein the non-AVB stream is received as a multicast message having a same stream identifier as the AVB stream and having a Priority Code Point value that allows the AVB network to pass the multicast message with the same stream identifier as the AVB stream.

16. The computer-program product of claim 15 further comprising instructions to output a diagnostic indicator to an operator in response to receiving the stream of data as the non-AVB stream of data, the diagnostic indicator being indicative of a reduced performance mode of communication over the AVB network.

17. The computer-program product of claim 15 further comprising instructions to transmit a ready message indicative of the listener requesting to receive the stream of data as the AVB stream of data with the specified stream identification, prior to receiving the talker declaration message from the at least one bridge controller.

18. The computer-program product of claim 15 further comprising instructions to transmit a ready message indicative of requesting to receive the stream of data as the AVB stream of data with the specified stream identification in response to receiving the talker declaration message.

19. The computer-program product of claim 15 wherein the specified stream identification is a predetermined stream destination address.

20. The computer-program product of claim 19 further comprising instructions to output video and audio data included in the stream of data to at least one of a video display and a speaker.

* * * * *